UNITED STATES PATENT OFFICE.

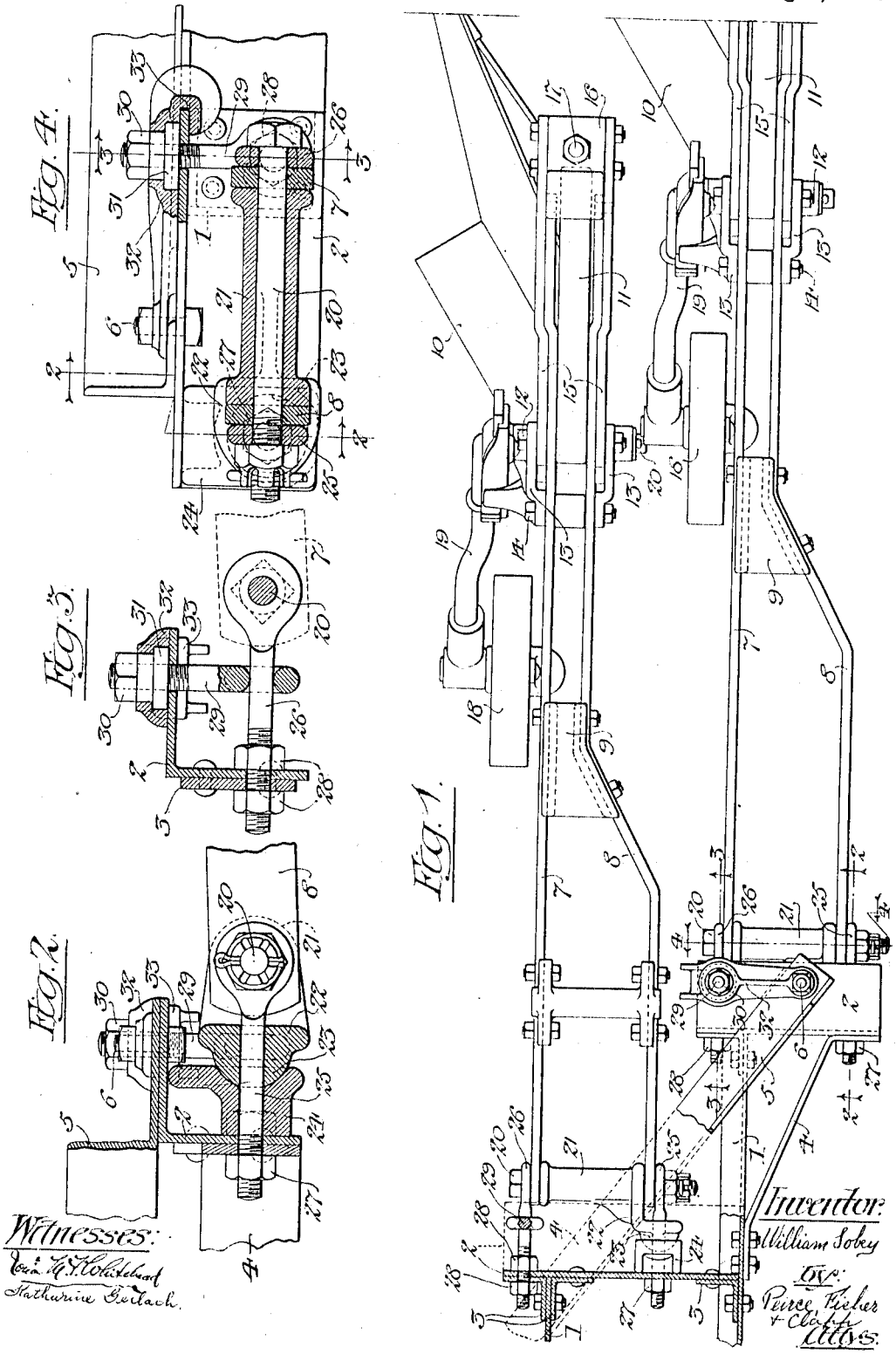

WILLIAM SOBEY, OF RACINE, WISCONSIN, ASSIGNOR TO J. I. CASE PLOW WORKS, OF RACINE, WISCONSIN, A CORPORATION.

GANG-PLOW.

1,106,119. Specification of Letters Patent. Patented Aug. 4, 1914.

Original application filed May 25, 1911, Serial No. 629,269. Divided and this application filed March 20, 1912. Serial No. 685,080.

*To all whom it may concern:*

Be it known that I, WILLIAM SOBEY, a citizen of the United States, and a resident of Racine, county of Racine, and State of Wisconsin, have invented certain new and useful Improvements in Gang-Plows, of which the following is a full, clear, and exact description.

The invention relates to gang plows and more particularly to means for adjustably connecting the plows to the draft frame.

The invention seeks to provide simple and effective connecting or coupling devices for connecting the plows to the draft frame and by which the plows may be adjusted in lateral direction and also adjusted to tilt the plow bodies.

The present application is a division of an earlier application filed by me on May 25th, 1911, Serial No. 629,269, in which the entire construction of the gang plow is shown and described.

The present invention relates, as stated, to a coupling means for connecting the plows to the draft frame and consists in the features of improvement hereinafter set forth, illustrated in the preferred form in the accompanying drawings and more particularly pointed out in the appended claims.

In the drawings, Figure 1 is a plan view showing a portion of the draft frame with two of the plows connected thereto and with parts of the frame shown in section to illustrate the details of the coupling. Figs. 2 and 3 are detail sections on the lines 2—2 and 3—3, respectively, of Figs. 1 and 4. Fig. 4 is a cross-section on the line 4—4 of Fig. 1.

As set forth in the prior application referred to, the wheel supported draft frame preferably comprises a series of longitudinally extending bars 1 connected at their rear ends by a number of transverse angle bars 2, which form a series of steps to which the plows are connected. Only the two rearmost step angle bars are shown in the drawings and one of these bars is in section in Fig. 1, to show the construction of the coupling. As illustrated, the step angle bars 2 are connected to the longitudinal bars 1 by angle pieces 3 and the rearmost angle bar 2 is connected to the adjacent longitudinal bar by a brace 4. The several angle bars which form the steps to which the plows are coupled are also preferably connected by an inclined brace bar 5 which extends over the step angles and is secured to the upper horizontal flange of each step bar by a bolt 6.

The beam of each plow comprises two main bars 7 and 8 which are spaced apart at their rear ends and somewhat further apart at their forward ends. In the construction shown, the bar 8 is offset intermediate its ends and a filler block 9 is interposed between and bolted to the bars at the inclined offset portion of the bar 8.

The plow bodies 10 may be connected to the beam bars in any suitable manner. In the construction shown, the plow bodies 10 are connected to upwardly and forwardly extending standards 11 which are arranged between the rear portions of the beam bars 7 and 8 and are pivotally connected thereto by bolts 12. The ends of each bolt 12 extend through a pair of brackets 13 which are also secured to the outer faces of the beam bars 7 and 8 by a bolt 14. The rear portions of the brackets 13 are spaced from the main beam bars 7 and 8 and overlap the forward ends of a pair of supplemental beam bars 15. The latter are connected to the main beam bars at their forward ends by the pivot bolt 12. At their rear ends, the supplemental beam bars 15 support a block 16 which is connected to the plow standard by a vertical bolt 17. Any other suitable means may be employed for connecting the plow bodies to the beam bars.

Each of the plow beams is provided with a gage wheel 18 mounted on the lower end of a standard 19, the horizontal pivot 20 of which extends through the brackets 13 below the plow beam. The lift mechanism (not shown) is connected to the gage wheel standard. Other means may be employed for raising and lowering the plows. The parts thus far described may be of any usual or suitable construction.

Each of the plows is individually connected to the draft frame and each coupling comprises a substantially horizontal pivot bolt, arranged transversely to the line of draft and upon which the plow swings in vertical direction. Means are provided for adjusting the horizontal pivot bolt in a vertical plane to tilt the beam bars and plow body connected thereto and means are also provided for swinging the pivot bolt in a horizontal plane to adjust the plow laterally, so that the different plows of the gang may be properly and uniformly spaced from one another.

In the preferred embodiment of the invention illustrated, a transverse pivot bolt 20 extends through the forward ends of the pair of beam bars 7 and 8 and through a sleeve 21 interposed between the beam bars. The sleeve 21 has a swinging or ball and socket connection with the frame at one end. As shown, the sleeve is provided with a forwardly and laterally projecting arm 22 terminating in a semi-spherical head or ball 23. This ball is seated within a socket formed in a cast metal member 24 which is arranged within the angle of the step bar 2 and abuts against the vertical and horizontal flanges thereof. A pair of eye-bolts 25 and 26 engage the ends of the pivot bolt 20 outside of the beam bars 7 and 8, extend forwardly therefrom, and pass loosely through openings in the vertical flange of the step bar 2. The left-hand eye-bolt 25 extends through openings formed in the ball and socket members 23 and 24, and a nut 27, threaded on the forward end of the bolt, engages the front face of the step bar. This bolt holds the ball and socket members in engagement and, in the position shown, with the flat upper face of the socket member 24 engaging the horizontal flange of the step bar, so that the socket member cannot turn. If desired, the socket member may be also bolted or fastened to the horizontal flange of the angle bar.

The eye-bolt 26 extends through the right-hand portion of the angle bar 2 which projects beyond the end of the adjacent longitudinal frame bar 1. This bolt also extends through one of the strengthening clips or angle pieces 3. Set nuts 28 threaded on opposite sides of the vertical flange of the angle bar 2, serve to adjust the bolt 26 to swing the right-hand end of the pivot bolt 20 horizontally in the direction of the line of draft. The beam bars and plow body connected to the bolt 20 are thus shifted or adjusted in lateral direction and by means of this adjustment, the plows of the gang may be properly and uniformly spaced.

An eye-bolt 29 engages the rear end of the eye-bolt 26 and extends upwardly and vertically through the horizontal flange of the angle bar 2. At its upper end, the bolt is provided with an adjusting nut 30 which rests upon the upper face of the bar 2. The lower portion of the nut 30 is cylindrical and is provided with an annular rib or shoulder 31 and these parts of the nut are rotatably mounted within a recess formed in a clip 32. The clip is secured to the upper face of the step bar to thereby hold the nut 30, bolt 29 and the parts connected thereto against vertical movement. In the form shown, this clip is provided with a hooked end 33 which engages the end of the angle bar 2. The opposite end of the clip 32 overlaps the horizontal flange of the inclined brace bar 5 and is held in position by the bolt 6 which secures the brace bar to the angle bar 2. By this arrangement, the vertical adjusting bolt 29 and the parts connected thereto are normally held against vertical movement, but by rotating the nut, the bolt 29 is adjusted in vertical direction and the rear end of the bolt 26 and the right-hand end of the pivot bolt 20 are raised and lowered. In this way the pivot bolt 20 is swung in a vertical plane and the beam bars and plow body connected thereto correspondingly shifted to level or adjust the plow so that it will properly perform its work.

In effecting the horizontal and vertical adjustment of the pivot bolt 20, it is understood that the nuts 27 and 28 on the horizontal eye-bolts 25 and 26 are first loosened and when the desired adjustment is effected, these nuts are tightened to securely hold the pivot bolt 20 and pair of beam bars 7 and 8 connected thereto in position, the bolt 26 fits loosely in the opening in the parts 2 and 3 so that the rear end of the bolt is free to swing vertically to a limited extent, when the nuts 28 are loosened, sufficient to permit of the desired vertical adjustment of the pivot bolt 20 about a horizontal axis. It is, if course, understood that the pair of beam bars and plow bottom connected thereto are free to swing vertically upon the pivot bolt 20, but they are rigidly held against movement in lateral direction or about an axis extending in the direction of the line of draft.

It is obvious that changes may be made in the details set forth without departure from the essentials of the invention as defined in the claims.

I claim as my invention:—

1. In a plow, the combination with a draft frame, of a trailing plow and a connection between said plow and said frame comprising a substantially horizontal pivot transverse to the line of draft, adjustable means for swinging said pivot in vertical direction and means adjustable in the direction of the line of draft for swinging said pivot horizontally.

2. In a plow, the combination with a draft frame, of a trailing plow and a connection between said plow and said frame comprising a substantially horizontal pivot bolt transverse to the line of draft, and horizontal and vertical bolts arranged substantially at right angles to said pivot bolt for supporting and adjusting one end thereof.

3. In a plow, the combination with a draft frame, of a plow having a pair of beam bars spaced apart at their forward ends, a transverse pivot whereon said beam bars are hung at their forward ends and separate connections between the opposite ends of said transverse pivot and said frame, the connections at one end of said transverse pivot being adjustable.

4. In a plow, the combination with a draft frame, of a plow having a pair of beam bars spaced apart at their forward ends, a transverse pivot bolt engaging the forward ends of said beam bars, said pivot bolt having a swinging connection at one end with said frame, and horizontal and vertical adjustable connections therewith at its opposite end.

5. In a plow, the combination with a draft frame, of a plow having a pair of beam bars spaced apart at their forward ends, a transverse pivot bolt whereon said beam bars are hung at their forward ends, a ball and socket connection between one end of said pivot bolt and said draft frame, and horizontal and vertical adjusting bolts connecting the opposite end of said bolt to said frame.

6. In a plow, the combination with a draft frame, of a plow having a pair of beam bars spaced apart at their forward ends and connections between the forward ends of said beam bars and said draft frame comprising a transverse pivot bolt engaging the ends of said bars, a sleeve hung on said bolt between said bars, ball and socket members on said frame and one end of said sleeve, and means for adjusting the opposite end of said pivot bolt vertically and horizontally in direction of the line of draft.

7. In a plow, the combination with a draft frame, of a plow having a pair of beam bars spaced apart at their forward ends, a transverse pivot bolt extending through the forward ends of said bars, a sleeve hung on said bolt between said bars, ball and socket members on said frame and one end of said sleeve, horizontal eye bolts connecting the opposite ends of said pivot bolt to said draft frame, one of said eye bolts extending through said ball and socket members and the other being adjustable, and a vertical adjusting eye bolt connecting the outer end of said horizontal adjusting bolt to said frame.

8. In a plow, the combination of a draft frame having a series of short, transverse bars at its rear portion forming a series of steps, said transverse step bars having upper horizontal and vertical depending flanges, a number of trailing plows, each having a pair of beam bars spaced apart at their forward ends, and a connection between the forward ends of each pair of beam bars and one of said step bars comprising a transverse pivot bolt whereon said pair of beam bars are hung, horizontal bolts connecting the ends of said pivot bolt to the vertical flange of said step bar and a vertical bolt for adjusting one end of said pivot bolt extending through the horizontal flange of said step bar.

WILLIAM SOBEY.

Witnesses:
  Roy Winfield Martin,
  Herman Charles Groenke.

---

Copies of this patent may be obtained for five cents each, by addressing the "Commissioner of Patents, Washington, D. C."